(12) United States Patent  
Dooley

(10) Patent No.: US 7,723,931 B2  
(45) Date of Patent: May 25, 2010

(54) STARTING A GAS TURBINE ENGINE USING A SENSORLESS, BRUSHLESS MOTOR

(75) Inventor: Kevin A. Dooley, Mississauga (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 0 days.

(21) Appl. No.: 11/421,089

(22) Filed: May 31, 2006

(65) Prior Publication Data

US 2007/0296215 A1    Dec. 27, 2007

(51) Int. Cl.
*H02P 21/00* (2006.01)
(52) U.S. Cl. .................. 318/139; 318/400.02; 322/10
(58) Field of Classification Search .............. 318/139, 318/140, 254, 439, 138, 141, 400.02, 400.32, 318/400.34; 322/10, 39
See application file for complete search history.

(56) References Cited

U.S. PATENT DOCUMENTS

| | | | |
|---|---|---|---|
| 5,184,456 A * | 2/1993 | Rumford et al. ............... 60/778 |
| 5,428,275 A | 6/1995 | Carr et al. |
| 5,461,293 A * | 10/1995 | Rozman et al. ............. 318/603 |
| 5,495,162 A * | 2/1996 | Rozman et al. ................ 322/10 |
| 5,801,509 A | 9/1998 | Sawa et al. |
| 5,920,162 A * | 7/1999 | Hanson et al. ............... 318/254 |
| 6,836,086 B1 * | 12/2004 | Goldberg et al. ............ 318/141 |
| 2003/0189339 A1 | 10/2003 | Gupta et al. |
| 2004/0080300 A1* | 4/2004 | Xu et al. ........................ 322/59 |
| 2007/0040383 A1 | 2/2007 | Mehl et al. |

* cited by examiner

*Primary Examiner*—Rina I Duda
(74) *Attorney, Agent, or Firm*—Ogilvy Renault LLP

(57) ABSTRACT

A method and apparatus for starting a gas turbine engine using a brushless sensorless machine, the machine having a rotor and a stator with windings, the method including positioning the rotor at a desired position with respect to the stator and then energizing the windings of the stator.

20 Claims, 5 Drawing Sheets

STARTING A GAS TURBINE ENGINE USING A SENSORLESS, BRUSHLESS MOTOR

TECHNICAL FIELD

This invention relates to the field of gas turbine engines. More precisely, the invention pertains to a method and apparatus for starting such machines.

BACKGROUND OF THE INVENTION

Starting a gas turbine aircraft engine on the ground with a sensorless brushless starter-generator typically involves sending a predetermined sequence of current signals to the windings of the stator to cause the rotor magnets to begin to rotate in accordance with the predetermined sequence of current signals provided to the corresponding windings of the stator. Since the rotor position is not known, a trial and error approach is typically used, wherein a rotor position is assumed and current provided to the stator based on the assumed position and, if starting is not successful, a different rotor position is assumed, and the process is repeated, until starting occurs.

As difficult as this is, in applications such as a turbofan or turboprop where the rotor of the starter-generator may already be rotating as a result of ground airflow through the engine, trial and error starting becomes even more difficult. Therefore, there is a need for improvement.

SUMMARY OF THE INVENTION

According to an aspect, there is provided a method for starting a gas turbine engine drivingly coupled to a brushless machine comprising a rotor and a stator having windings, the method comprising the steps of: providing DC current to at least one of the windings to position the rotor at a desired position with respect to the stator; and then energizing the windings of the stator to start the gas turbine engine.

According to another aspect, there is provided a method for starting a turbofan engine drivingly coupled to a starter-generator comprising a rotor and a corresponding stator comprising windings, the method comprising providing DC current to at least one of the windings for a sufficient time to stop residual rotation of the rotor; providing DC current to at least one the windings to position the rotor at a desired position with respect to the stator; and then energizing the windings of the stator to start the turbofan engine.

According to another aspect, there is provided a turbofan engine comprising a shaft drivingly connected to an electric motor, the motor having a permanent magnetic rotor and a stator comprising a winding, the motor further having a rotor stopping apparatus adapted to stop residual rotor rotation, a rotor repositioning apparatus adapted to position the rotor in a desired position prior to motor starting, a motor starting apparatus for starting the turbofan engine.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
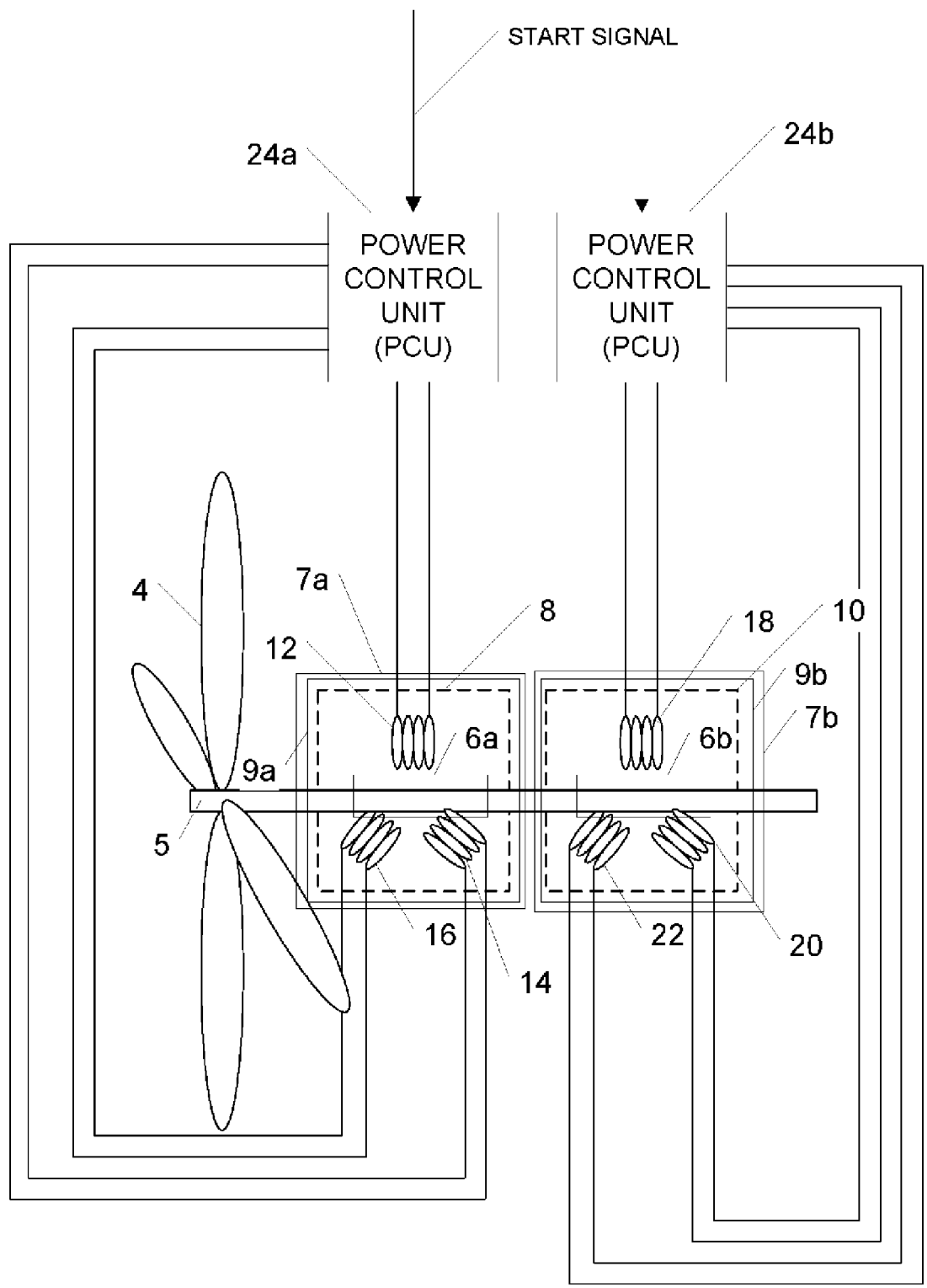
FIG. 1 is a schematic showing an embodiment of a system for starting a brushless sensorless machine.

Now referring to FIG. 1, there is shown an embodiment of a system for using a brushless sensorless machine as a starter for rotating equipment, which in this embodiment is a gas turbine aircraft engine such as a turbofan or a turboprop.

A set of rotating blades 4 is mounted to a shaft 5, which is coupled to the permanent magnet rotors 6a, 6b (which are also referred to, for simplicity, as rotors 6) of sensorless brushless machines 7a, 7b (which are also referred to, for simplicity, as machines 7), each of which includes a stator 9a, 9b (which are also referred to, for simplicity, as stators 9). The rotors 6 rotate relative to stators 9. One stator 9a includes first group of windings 8 and the other stator 9b includes a second group of windings 10. The magnets of rotors 6 are preferably aligned relative to one another. The windings 8, 10 of machines 7 are electrically connected to respective power control units (PCU) 24a and 24b.

In this embodiment, the first group of windings 8 of machine 7a comprises 3-phase windings 12, 14 and 16, all of which are electrically connected to the power control unit 24a.

The second group of windings 10 of machine 7b also comprises 3-phase windings 18, 20 and 22 electrically connected to power control unit 24b.

In a starting or motoring mode, the power control unit 24a, inter alia, provides current to at least one winding of the first group of windings 8, as will be described further below. Among other things, the current in windings 8 is adapted to cause rotation of rotor 6 relative to stator 9.

Meanwhile, in the same mode, the power control unit 24b, inter alia, receives a feedback signal provided by at least one winding of the second group of windings 10, which feedback signal may be used to determine the position of the moving rotor 6 with respect of the stator 9.

The skilled addressee will appreciate in light of the present description that more or less than three windings may be used per machine, and that the machine(s) need not necessarily require 3-phase current. The skilled reader will also appreciate that machine 7b is used, in the above embodiment, as a rotor position detector, and that other rotor position detectors may be substituted therefor. The term "sensorless" in the present application is intended to mean that no specific or dedicated rotor position detector is required.

Figure 2:
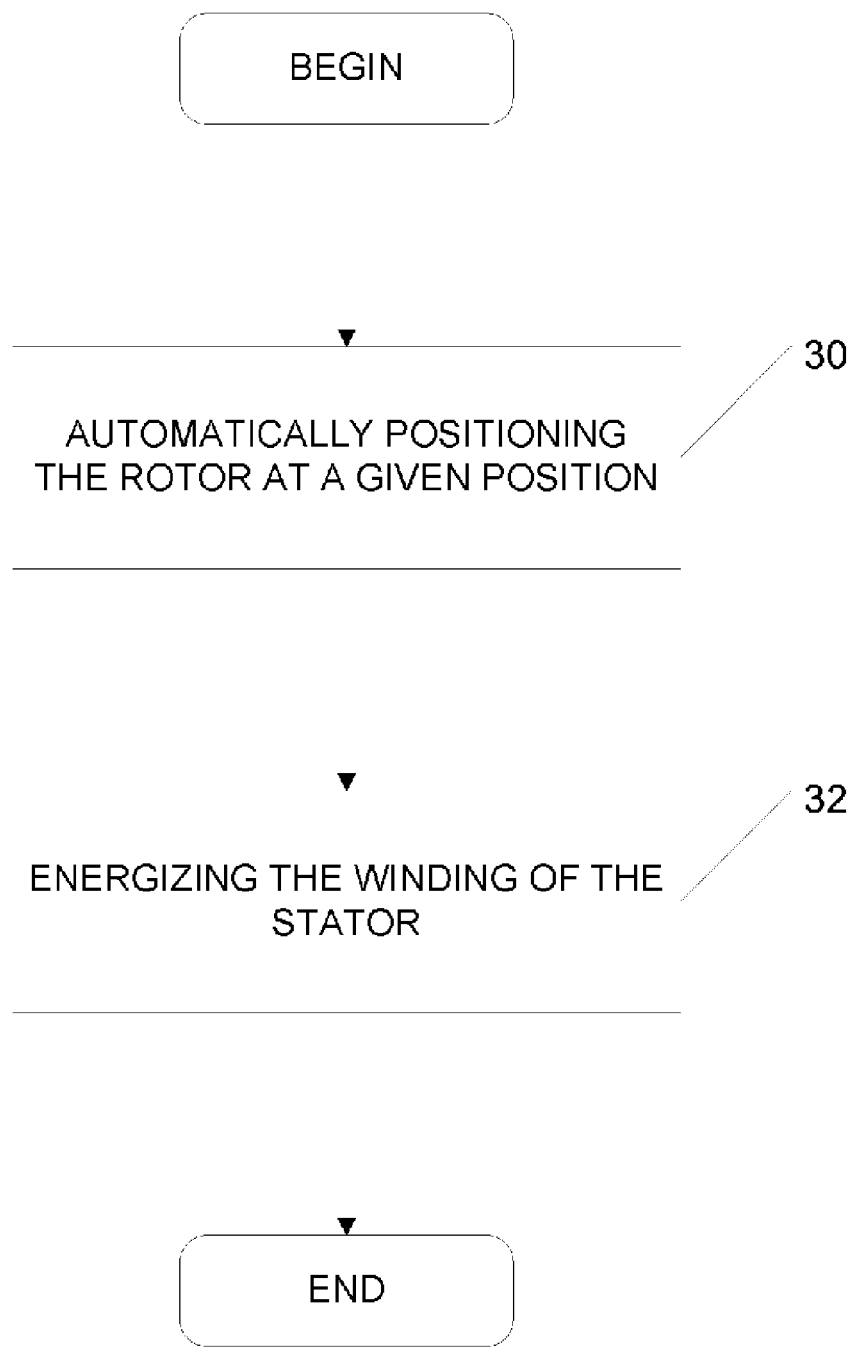
FIG. 2 is a flowchart showing a preferred approach to starting a brushless sensorless machine according to one embodiment.

Now referring to FIG. 2, a brushless sensorless machine start strategy is generally depicted.

According to step 30, the rotor is automatically positioned at a desired position by appropriately energizing certain windings, as will be described further below.

According to step 32, the windings of the stator are then sequentially energized, according to a given sequence, to force rotation of the rotor.

Figure 3:
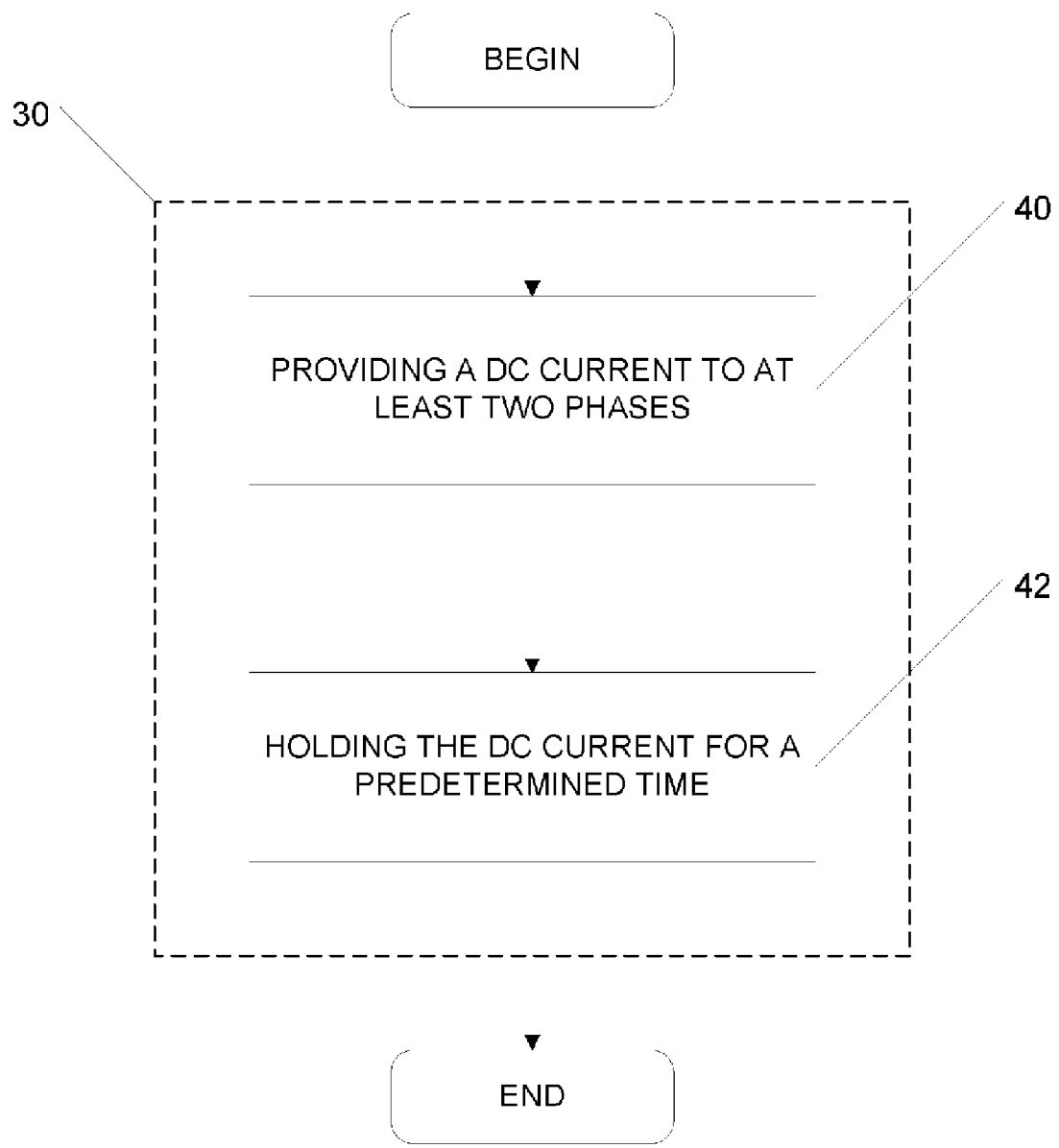
FIG. 3 is a flowchart showing a preferred approach to position the rotor at a desired position.

Now referring to FIG. 3, there is shown a general technique for automatically positioning the rotor at a desired position (step 30 of FIG. 2).

According to step 40, a DC current is provided (in response to a start command or signal, such as from a pilot) to at least one, and preferably at least two phases selected from of the two sets of windings 8, 10. Preferably, the two phases are selected from the same set of windings (i.e. as between sets 8 and 10), and preferably the DC current signal is provided to at least two phases of the first group of windings (e.g. 8) by its power control unit (e.g. 24a).

According to step 42, the DC current is provided to the windings for a predetermined amount of time, preferably sufficiently long to enable the rotor 6 to stop windmilling rotation (if any) and is positioned with respect to the stator, in response to the electromagnetic effect the DC current energized windings has on the rotor 6, so that the magnets of rotor 6 align with, and then stop, appropriately relative to the stationary magnetic poles temporarily created by the DC energization of the windings. It will be appreciated by the skilled reader that the amount of time the DC current needs be applied, to ensure desired stopping and positioning of the rotor, will vary depending on the torque and polar moment of inertia of the rotor system and the speed of rotation before the current is applied. For a turbofan engine, this would typically be at least a few seconds, or more. It will also be appreciated that the nature and strength of DC current applied will be dependent on the rotor and winding configuration, as well as the torque and polar moment of inertia of the rotor system and the speed of rotation before the current is applied. To increase stopping effectiveness, preferably the two energized windings are spaced-apart from one another, circumferentially around the stator, such as would be the case for adjacent phases in a 3-phase machine. According to the described technique, the position of the rotor thus becomes known, since it has stopped and been positioned in a desired position. An apparatus implementing step 42 would be an example of a rotor stopping apparatus.

In another approach, un-energized windings of machine 7b are monitored to confirm when rotation is stopped (i.e. no generated voltages in the windings, meaning the rotor is stationary). The selected windings are then energized as described above to position the rotor in the desired position. An apparatus implementing the positioning of the rotor in such a way would be an example of a rotor repositioning apparatus.

Figure 4:
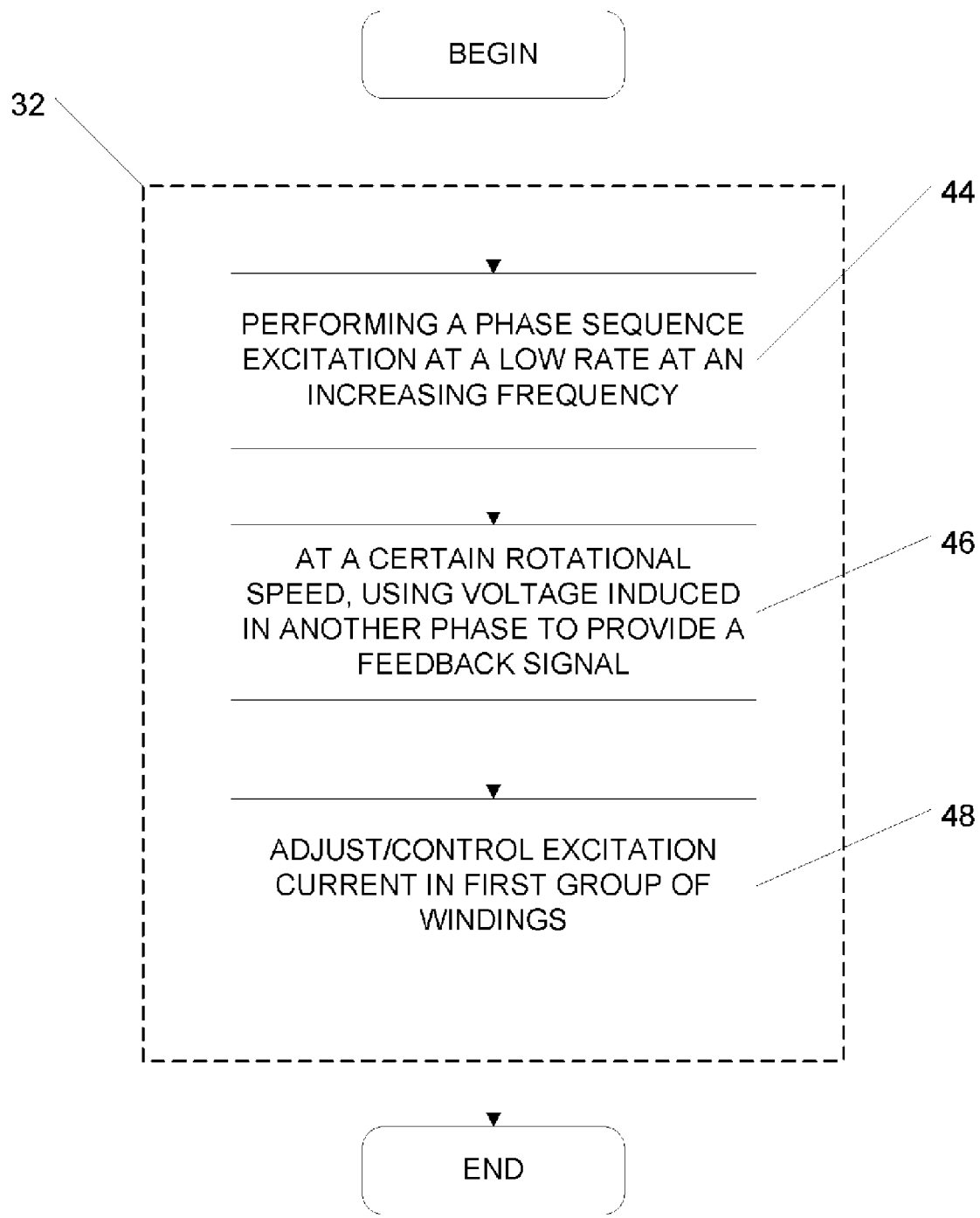
FIG. 4 is a flowchart showing how the windings of the rotor are preferably energized.

Now referring to FIG. 4, there is shown one example of how the windings of the stator are energized (step 32) to start the gas turbine engine. An apparatus implementing step 32 at least in part would be an example of a motor starting apparatus. Machine 7 would also be an example of a motor starting apparatus.

According to step 44, a phase excitation sequence of the first winding set 8 is performed, first at a low rate, and then at an ever-increasing frequency to accelerate machine, and thus the engine. Parameters related to this aspect of the present technique are known in the art, and include, for example, the polar moment of inertia of the engine, the applied torque, design characteristics of the starter motor (machine 7), and so on. The specifics of starting are not intended to form part of this invention.

According to step 46, once a certain minimum rotational speed of the rotor is achieved, the voltage induced in the second winding set 10 by the passing rotor may be used as a feedback signal. The feedback signal is provided to the power control unit 24b and processed to provide a position of the rotor with respect to the stator. This information can be then used to appropriately control the excitation current provided to the first group of windings 8, to ensure the system is accelerated at the optimum rate (step 48).

Figure 5:
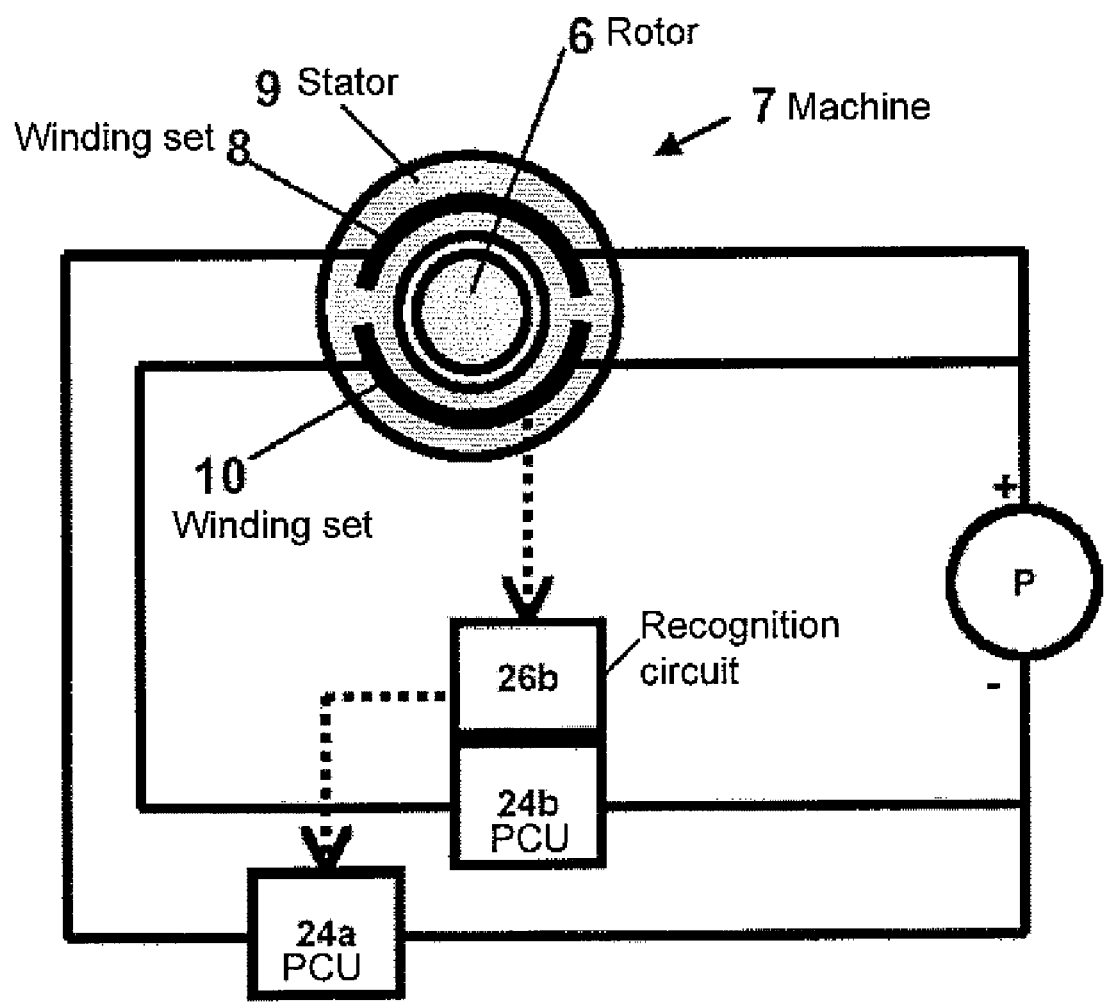
FIG. 5 is a schematic showing another embodiment of a system for starting a brushless sensorless machine.

Referring now to FIG. 5, preferably the two windings sets 8, 10 are provided spaced about one stator 9—that is, in a "dual channel" machine of the type depicted in FIG. 5 and described in more detail in applicant's co-pending U.S. patent application Ser. No. 10/724,148, published Jun. 2, 2005 as US2005/0116675. In this arrangement, a single stator is divided into two sectors, and the windings 8, 10 confined to respective sectors of the stator. Three-phase winding set 8 is electrically connected to power source P via a commutation circuit within PCU 24a and three-phase winding set 10 is preferably also selectively connected to power source P via commutation circuit within PCU 24b. Winding set 10 is also electrically connected to rotor position recognition circuit 26b within PCU 24b which is, in turn, connected for feedback communication with the commutation circuit of PCU 24a (as indicated by the stippled line). In starting mode, windings 8 are energized to cause rotor rotation, while the EMF induced in winding set 10 is fed back and processed for rotor position information, which is then provided to PCU 24a for control purposes, as described. Prior to starting, the step of stopping/positioning the rotor 6 is achieved by sending a DC (i.e. non-alternating or unidirectional) current to at least two windings of the winding sets 8, 10, and preferably two windings of the same winding set (e.g. two phases of winding set 8).

Other sensorless motor systems are known, and are suitable for use with the present technique. Any suitable sensorless machine system may be used.

The above method thus stops, if necessary, the rotor if it was previously rotating (due to air flow through the engine, for instance). Furthermore, the positioning of the rotor with respect to the energized stator windings enables the positioning of the rotor magnets at a known (desired) position, such that the phase excitation sequence to be applied will always be from a correct point to cause the rotor rotation in the proper direction. The trial-and-error approach of the prior art is thus unnecessary.

The embodiments of the invention described above are intended to be exemplary only, and one skilled in the art will recognize that other changes may also be made to the described embodiments without departing from the scope of the invention disclosed. For example, during the rotor stopping/position step, any number windings may be provided with DC current to fix rotor position. Although the use of two windings sets 8, 10 is described above, any suitable number of winding sets may be used. In the dual channel embodiment, more than two such channels may be provided. Any suitable number of phases (i.e. not only 3-phase) may be provided to the motor 7. Still other modifications which fall within the scope of the present invention will be apparent to those skilled in the art, in light of a review of this disclosure, and the scope of the invention is therefore intended to be limited solely by the scope of the appended claims.

I claim:

1. A method for starting a gas turbine engine drivingly coupled to a brushless and sensorless machine operating as a motor, the machine comprising a rotor and a stator having windings, said method comprising:

provviding DC current to at least one of the windings to position said rotor at a desired position with respect to said stator; and energizing said windings using a phased AC excitation sequence to start the brushless machine, and thereby the gas turbine engine.

2. The method as claimed in claim 1, wherein said positioning said rotor comprises holding said DC current for a predetermined time to ensure said desired position is achieved.

3. The method of claim 2, comprising providing the same or another DC current to stop a rotation of the rotor prior to said positioning of said rotor.

4. The method as claimed in claim 1, wherein said positioning said rotor at a desired position comprises providing said DC current to at least two phases of a three phase winding.

5. The method as claimed in claim 1, further comprising monitoring said DC current provided to at least one of the windings to determine that the rotor is not rotating prior to said energizing step.

6. The method as claimed in claim 1, wherein the positioning said rotor at a desired position with respect to said stator comprises positioning an alternating current (AC) permanent magnet starter-generator with respect to said stator.

7. The method as claimed in claim 1, wherein the energizing comprises providing an alternating current (AC) current to at least one of said windings.

8. The method as claimed in claim 1, wherein the providing the DC current comprises supplying the DC current to the at least one winding to present a non-rotating magnetic field to the rotor.

9. A method for starting a turbofan engine drivingly coupled to a starter-generator operating as a sensorless motor, the starter-generator comprising a rotor and a corresponding stator comprising windings, said method comprising:
   providing DC current to at least one of the windings;
   stopping residual rotation of the rotor using said DC current;
   using the same or another DC current to position said rotor at a desired position with respect to said stator; and
   energizing said windings of said stator using phased AC excitation to start the starter-generator, and thereby the turbofan engine.

10. The method as claimed in claim 9, wherein the providing of said DC current comprises providing said DC current to at least two of a multi-phase winding set.

11. The method as claimed in claim 9, further comprising monitoring said DC current provided to at least one the windings to determine that the rotor has stopped.

12. The method as claimed in claim 9, wherein the positioning comprises positioning an alternating current permanent magnet starter-generator.

13. The method as claimed in claim 9, wherein the energizing comprises providing an alternating current (AC) current to at least one of said windings.

14. The method as claimed in claim 9, wherein the providing the DC current comprises supplying the DC current to the at least one winding to present a non-rotating magnetic field to the rotor.

15. A turbofan engine comprising:
   a shaft drivingly connected to a sensorless electric motor, the motor having a permanent magnetic rotor and a stator comprising a winding, the motor further having a rotor stopping apparatus adapted to stop residual rotor rotation using DC current, a rotor repositioning apparatus for positioning the rotor in a desired position prior to starting of the motor, and a motor starting apparatus for starting said turbofan engine using phased AC excitation.

16. The turbofan engine as claimed in claim 15, wherein the motor comprises an alternating current (AC) motor configured to rotate in response to an alternating current (AC) provided to the winding, and wherein the rotor stopping apparatus comprises a DC source and the winding.

17. The turbofan engine as claimed in claim 16, wherein the repositioning apparatus comprises another DC source and the winding.

18. A method for starting a gas turbine engine drivingly coupled to a brushless machine operating as a sensorless motor, the machine comprising a rotor having at least one magnet and a stator having multi-channel windings, the method comprising:
   providing DC current to at least one of the windings to align the at least one rotor magnet in a desired position with respect to one or more magnetic poles created in the stator by the DC current, the desired position selected for efficient starting of the gas turbine engine;
   energizing the multi-channel windings using a first, relatively low-rate phased AC excitation sequence to start the gas turbine engine.

19. The method of claim 18, comprising energizing multi-channel windings using a second, relatively high-rate chased AC excitation sequence to start the gas turbine engine.

20. The method of claim 18, comprising providing the same or another DC current to the at least one winding to stop the rotor in the desired position prior to energizing the windings using the phase excitation sequence.

* * * * *